US006351692B1

United States Patent
Eaton et al.

(10) Patent No.: US 6,351,692 B1
(45) Date of Patent: Feb. 26, 2002

(54) METHOD AND APPARATUS FOR CONFIGURING A GENSET CONTROLLER FOR OPERATION WITH PARTICULAR GENSETS

(75) Inventors: Zane C. Eaton, Plymouth; Jonathan D. Churchill, Sheboygan, both of WI (US)

(73) Assignee: Kohler Co., Kohler, WI (US)

( * ) Notice: Subject to any disclaimer, the term of this patent is extended or adjusted under 35 U.S.C. 154(b) by 0 days.

(21) Appl. No.: 09/695,167

(22) Filed: Oct. 24, 2000

(51) Int. Cl.[7] .................................................. G05D 3/12

(52) U.S. Cl. ...................... 700/287; 700/286; 700/289; 700/290; 700/18; 700/19; 361/20; 361/21; 361/93.2; 361/93.6; 322/10; 322/19; 322/20; 323/318; 323/319; 323/322

(58) Field of Search .............................. 700/18–19, 22, 700/86, 286, 287, 289, 290, 292, 295, 296; 361/20, 21, 22, 24, 93.2, 93.6, 94–96; 322/10–12, 19–24; 323/318, 319, 320, 321, 322

(56) References Cited

U.S. PATENT DOCUMENTS

| | | | |
|---|---|---|---|
| 3,654,484 A | 4/1972 | Jorgenson et al. | 307/149 |
| 3,715,652 A | 2/1973 | Elliston | 323/268 |
| 4,128,771 A | 12/1978 | Domenico | 307/52 |
| 4,208,693 A | 6/1980 | Dickens et al. | 361/94 |
| 4,219,860 A | 8/1980 | DePuy | 361/94 |
| 4,245,182 A | 1/1981 | Aotsu et al. | 322/20 |
| 4,280,060 A | 7/1981 | Kure-Jensen et al. | 290/40 R |
| 4,322,630 A | 3/1982 | Mezera et al. | 290/40 C |
| 4,326,159 A | 4/1982 | Aotsu et al. | 322/19 |
| 4,330,743 A | 5/1982 | Glennon | 322/10 |
| 4,345,288 A | 8/1982 | Kampf et al. | 361/31 |
| 4,346,337 A | 8/1982 | Watrous | 322/25 |
| 4,368,520 A | 1/1983 | Hwang et al. | 700/289 |
| 4,403,292 A | 9/1983 | Ejzak et al. | 700/292 |
| 4,403,293 A | 9/1983 | Bradt et al. | 700/287 |
| 4,438,385 A | 3/1984 | Sato et al. | 322/28 |
| 4,438,498 A | 3/1984 | Sekel et al. | 702/60 |
| 4,443,828 A | 4/1984 | Legrand et al. | 361/93.6 |
| 4,477,765 A | 10/1984 | Glennon et al. | 322/20 |

(List continued on next page.)

OTHER PUBLICATIONS

Protective Relaying Principles and Applications, 2d ed., J. Lewis Blackburn, pp. 248–249, 312–315, and 370–371, 1998.
BE1–50/51B Time Overcurrent Relay, Basler Electric, 5 pages, 6–92 and 7–96.
Generator Protection, Ch. 11, ANSI/IEEE Std 242–1986, pp. 441–451 and 470–471.
Kohler Power Systems literature: form G12–197, 6/96; form G6–34, 2/97; form G11–63, 10/95; form G11–56, 6/94; form G6–35, 3/98; and form TIB–102, 11/97.

(List continued on next page.)

Primary Examiner—William Grant
Assistant Examiner—Ramesh Patel
(74) Attorney, Agent, or Firm—Quarles & Brady LLP

(57) ABSTRACT

A genset controller that is configurable for controlling a variety of types of gensets, as well as a method of configuring a genset controller for controlling a genset, are disclosed. The genset controller includes a memory for storing a plurality of software routines, a personality profile data set, and a user-settable data set, and further includes a processor coupled to the memory for executing the software routines and reading data from the personality profile data set and the user settable data set to control the genset. The genset controller additionally includes an input port coupled to the memory for enabling changes to the personality profile data set and the user-settable data set to be downloaded into the memory. The personality profile data set and the user-settable data set include data that configures the genset controller for operation with a particular genset.

20 Claims, 3 Drawing Sheets

U.S. PATENT DOCUMENTS

| | | | | |
|---|---|---|---|---|
| 4,481,459 A | | 11/1984 | Mehl et al. | 322/10 |
| 4,486,801 A | | 12/1984 | Jackovich et al. | 361/21 |
| 4,498,016 A | | 2/1985 | Earleson et al. | 290/40 R |
| 4,527,071 A | | 7/1985 | Ausiello | 290/4 R |
| 4,533,863 A | | 8/1985 | Luhn et al. | 322/28 |
| 4,538,231 A | | 8/1985 | Abe et al. | 700/298 |
| 4,550,379 A | | 10/1985 | Kawai et al. | 700/287 |
| 4,559,487 A | | 12/1985 | Sims et al. | 322/24 |
| 4,583,036 A | | 4/1986 | Morishita et al. | 320/136 |
| 4,589,052 A | | 5/1986 | Dougherty | 361/94 |
| 4,593,348 A | | 6/1986 | Tewesmeier | 363/85 |
| 4,598,373 A | | 7/1986 | Morishita et al. | 701/1 |
| 4,602,341 A | | 7/1986 | Gordon et al. | 700/286 |
| 4,617,626 A | | 10/1986 | Morishita et al. | 701/33 |
| 4,651,081 A | | 3/1987 | Nishimura et al. | 320/123 |
| 4,653,442 A | * | 3/1987 | Swenson | 123/179 |
| 4,659,977 A | | 4/1987 | Kissel et al. | 320/150 |
| 4,670,704 A | | 6/1987 | Maehara et al. | 322/8 |
| 4,672,501 A | | 6/1987 | Bilac et al. | 361/96 |
| 4,682,097 A | | 7/1987 | Matsui | 320/123 |
| 4,701,690 A | | 10/1987 | Fernandez et al. | 322/28 |
| 4,714,869 A | | 12/1987 | Onitsuka | 322/20 |
| 4,731,547 A | | 3/1988 | Alenduff et al. | 307/85 |
| 4,777,425 A | | 10/1988 | MacFarlane | 322/28 |
| 4,800,291 A | | 1/1989 | Bowers | 307/87 |
| 4,839,575 A | | 6/1989 | MacFarlane | 322/25 |
| 4,855,664 A | | 8/1989 | Lane | 322/19 |
| 4,912,382 A | | 3/1990 | Koenig et al. | 318/563 |
| 4,937,561 A | | 6/1990 | Sasaki et al. | 340/646 |
| 4,996,646 A | | 2/1991 | Farrington | 700/293 |
| 5,006,781 A | | 4/1991 | Schultz et al. | 322/25 |
| 5,057,962 A | | 10/1991 | Alley et al. | 361/24 |
| 5,117,174 A | | 5/1992 | Kessler | 322/21 |
| 5,168,208 A | | 12/1992 | Schultz et al. | 322/25 |
| 5,206,776 A | | 4/1993 | Bodenheimer et al. | 361/20 |
| 5,216,350 A | | 6/1993 | Judge et al. | 322/25 |
| 5,294,879 A | | 3/1994 | Freeman et al. | 322/280 |
| 5,298,842 A | | 3/1994 | Vanek et al. | 318/473 |
| 5,303,160 A | | 4/1994 | Winter et al. | 700/292 |
| 5,305,234 A | | 4/1994 | Markus et al. | 702/132 |
| 5,309,312 A | | 5/1994 | Wilkerson et al. | 361/79 |
| 5,362,209 A | * | 11/1994 | Day | 417/342 |
| 5,376,877 A | | 12/1994 | Kern et al. | 322/32 |
| 5,390,068 A | * | 2/1995 | Schultz et al. | 361/95 |
| 5,418,675 A | | 5/1995 | Bodenheimer et al. | 361/20 |
| 5,450,268 A | | 9/1995 | Phillips et al. | 361/93.6 |
| 5,451,876 A | | 9/1995 | Sandford et al. | 324/322 |
| 5,477,827 A | | 12/1995 | Weisman, II et al. | 123/436 |
| 5,483,927 A | | 1/1996 | Letang et al. | 123/41.12 |
| 5,486,751 A | | 1/1996 | Koenig | 322/86 |
| 5,504,417 A | | 4/1996 | Kern et al. | 322/32 |
| 5,615,654 A | | 4/1997 | Weisman, II et al | 123/350 |
| 5,640,060 A | | 6/1997 | Dickson | 307/87 |
| 5,701,070 A | * | 12/1997 | Schultz | 322/37 |
| 5,732,676 A | | 3/1998 | Weisman et al. | 123/436 |
| 5,751,532 A | | 5/1998 | Kanuchok et al. | 361/94 |
| 5,754,033 A | | 5/1998 | Thomson | 322/45 |
| 5,761,073 A | | 6/1998 | Dickson | 702/75 |
| 5,847,644 A | | 12/1998 | Weisman, II et al. | 340/439 |
| 5,862,391 A | * | 1/1999 | Salas et al. | 700/286 |
| 5,886,504 A | | 3/1999 | Scott et al. | 322/15 |
| 5,938,716 A | | 8/1999 | Shutty et al. | 701/115 |
| 5,977,647 A | * | 11/1999 | Lenz et al. | 290/40 C |
| 5,978,729 A | | 11/1999 | Landes et al. | 701/115 |
| 5,999,876 A | | 12/1999 | Irons et al. | 701/115 |
| 6,005,759 A | * | 12/1999 | Hart et al. | 361/66 |
| 6,018,200 A | | 1/2000 | Anderson et al. | 290/40 B |
| 6,104,171 A | * | 8/2000 | Dvorsky et al. | 322/8 |
| 6,107,927 A | * | 8/2000 | Dvorsky et al. | 340/658 |

FOREIGN PATENT DOCUMENTS

GB     2 055 262 A     7/1980

OTHER PUBLICATIONS

System Coordination With Fast–Response Generators, Gordon S. Johnson, Kohler Co., Generator Division, 1983.

A Working Manual on Molded Case Circuit Breakers, $4^{th}$ ed., Westinghouse, pp. 162, 16, and 41–43, 3/93.

Literature concerning Automatic Engine Controllers by DynaGen Systems, Inc., found at http://dynagensystems.com, printed Mar. 1, 2000.

Literature concerning Diesel and Gas Generator Set, found at http://www2.savoiapower.com, printed Mar. 2, 2000.

Literature concerning alternators, found at http://www.wai–wetherill.com, printed Mar. 2, 2000.

Literature concerning electric motors, found at http://www.friesen.com, printed Mar. 2, 2000.

Regulation en temps réel d'une génératice asynchrone, Electronique Industrielle, pp. 70–73, avril, No. 86, Paris, France, 1985.

Digital Controller Design Method For Synchronous Generator Excitation And Stabilizer Systems; Part II: Hardware/Software Design And Implementation Results, IEEE Transactions on Power Systems, pp. 638–644, vol. PWRS–2, No. 3, Aug. 1987.

EE Handbook, 11th Edition, Fink & Beaty, pp. 18–27 through 18–39.

* cited by examiner

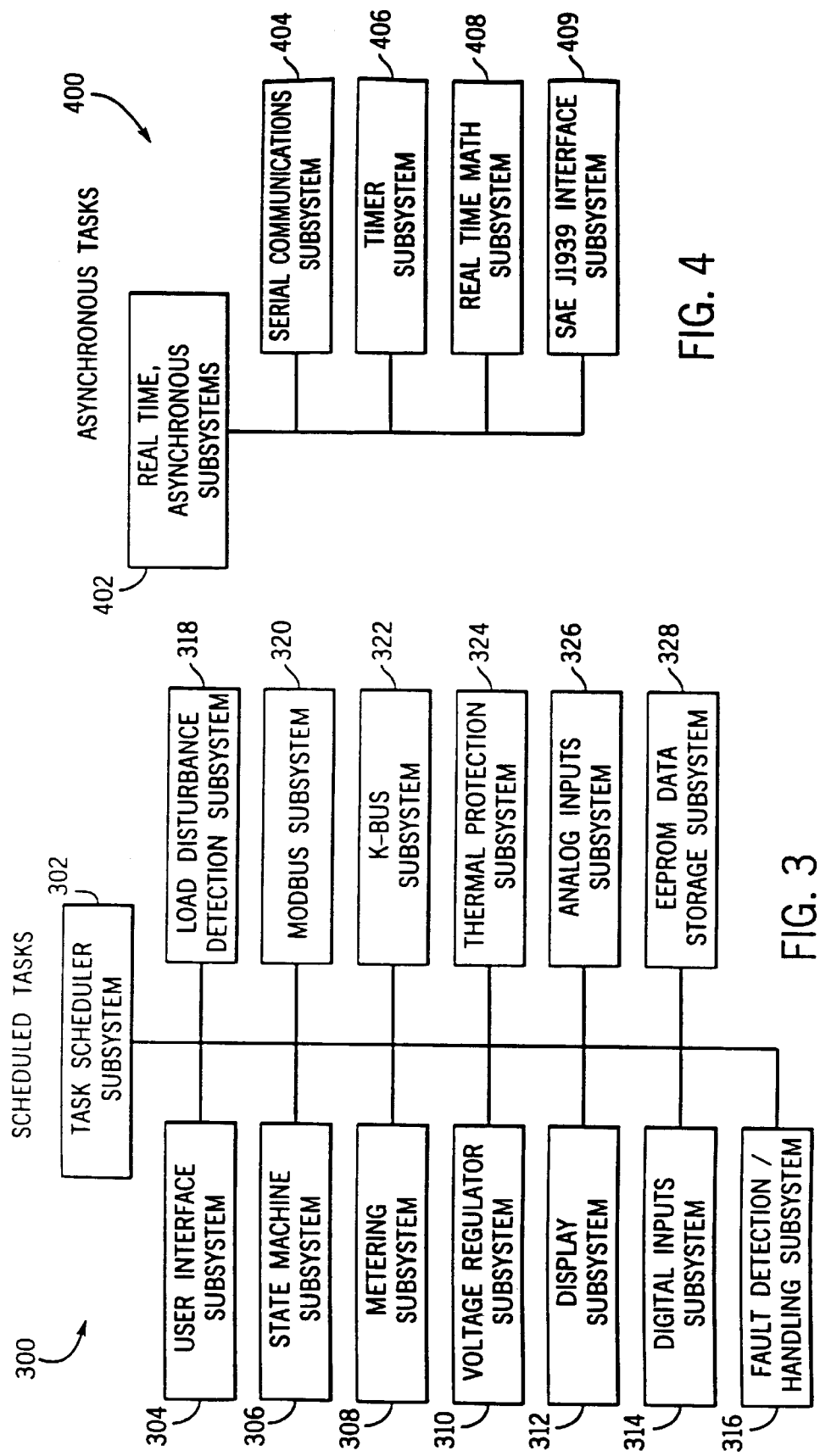

METHOD AND APPARATUS FOR CONFIGURING A GENSET CONTROLLER FOR OPERATION WITH PARTICULAR GENSETS

FIELD OF THE INVENTION

The present invention relates to the control of electric generator sets (gensets) including an engine and an alternator. In particular, the present invention relates to the configuration of controllers that are used to control and monitor such gensets.

BACKGROUND OF THE INVENTION

Electric generator sets (or "gensets") are widely used to provide electric power. A genset typically includes an engine coupled to an alternator, which converts the rotational energy from the engine into electrical energy. The terminal voltage of a genset is proportional to both the magnetic flux density within the alternator, and the speed of the engine. The magnetic flux density is typically determined by controlling an armature voltage or field current on the alternator, while the speed of the engine is typically determined by an engine governor.

It is known to employ a genset controller to control and monitor the operation of a genset, including the operation of the engine and alternator of the genset. In the past, genset controllers have been designed to control and operate with particular respective gensets. Because many gensets have had standard configurations and options, it was in some circumstances also possible to design genset controllers that could control and operate with multiple gensets, including gensets designed and manufactured by different companies.

Recently however, the variety of types and configurations of, and options available on, different gensets has increased such that it is becoming more difficult to design a "one-size fits all" genset controller. At the same time, because of an increased variety of genset manufacturers, it no longer suffices for the manufacturers of particular genset controllers to design genset controllers for use with only particular gensets. Clearly, a more flexible genset controller that is capable of being adapted for operation with a variety of different types and configurations of gensets, and/or a variety of options available on the gensets, is necessary in a modern marketplace in which many different gensets and genset configurations are available.

One example of the need for a more flexible genset controller relates to a new invention in the controlling of gensets concerning a thermal protection subroutine, which is described in a related patent application filed on the same date herewith, entitled "METHOD AND APPARATUS FOR PREVENTING EXCESSIVE HEAT GENERATION IN AN ALTERNATOR OF A GENERATOR SET", which is hereby incorporated by reference herein. This invention allows a genset controller to monitor the currents flowing within the alternator of the genset and to prevent the flowing of excessive currents within the alternator, which can lead to excessive heat exposure and damage the alternator.

By employing this new invention, a circuit breaker is no longer necessary within the alternator itself to prevent excessive currents within the alternator, as it is with many conventional alternators. However, despite this invention, alternators without circuit breakers will continue to be manufactured, and so it will be desirable for genset controllers to have the capability to operate both with alternators that have circuit breakers and with alternators that do not have circuit breakers.

Many other examples of variable features of gensets also exist. For example, some gensets are now controlled in their operation (at least in part) by engine control modules (ECMs). Depending upon whether the gensets are controlled by such ECMs, more or less control is exercised by the genset controllers to control the operation of the gensets. Further, the control signals provided by the genset controllers depend at least in part upon whether the control signals are provided to ECMs that are coupled in between the genset controllers and the gensets, rather than provided directly to the genset controllers. Also, certain additional information concerning the operation of the gensets is available to be provided to genset controllers when ECMs are employed that is unavailable otherwise. For all of these reasons, therefore, it would be desirable for genset controllers to be capable of being configured to operate with gensets that both are and are not controlled by ECMs.

Further, because of the variation in the configurations of different gensets that exists today, the control signals that should be provided by a genset controller to one genset to produce optimal performance by that genset are often different from the control signals that should be provided to a second genset to produce optimal performance by that genset. This is particularly the case with respect to the regulation of the field volts (or current) or excitation level of the alternator, which influences the output voltage of the alternator, and which is often performed by a voltage regulator of the genset controller. When a genset controller is not well-tailored to the genset being controlled, the genset controller often is less able to accurately and quickly measure or respond to feedback from the genset concerning changes in the performance of the genset due to changes in the load or other factors, with the result being less than optimal performance of the genset. Consequently, it would be desirable for genset controllers to be capable of being configured to vary in their operation depending upon the genset being controlled so that, regardless of the genset, optimal performance would result.

It would therefore be advantageous if a genset controller was developed which was capable of being configured to control and operate with a variety of gensets of different types and configurations and having a variety of different options, where control is understood broadly to encompass operations such as monitoring operations. It would particularly be advantageous if the genset controller could be configured to operate both with gensets having alternators that included circuit breakers to preclude excessive current flow within the alternators, and with gensets that required control by a genset controller having a thermal protection capability. It would further be advantageous if the genset controller could be configured to operate with gensets being controlled by ECMs as well as gensets without control by ECMs. It would additionally be advantageous if the genset controller could be configured to operate in conjunction with a variety of gensets having a variety of different performance parameters and qualities. It would further be advantageous if the genset controller could be easily configured both at the factory and in the field, and if the genset controller was limited in its configurability to assure that improper configuration did not occur.

SUMMARY OF THE INVENTION

The present inventors have discovered that a genset controller can be programmed with a variety of parameters to configure the genset controller for operation with a variety of different gensets and genset options, including gensets operating both with and without ECMs. The genset controller, which is programmed with application software that governs the operation of the genset and does not vary in dependence upon the genset being controlled, is further programmed with personality profile data and user-settable data which does vary depending upon the genset being controlled. The personality profile data is typically programmed at the time of manufacture of the genset at the factory and cannot be modified thereafter, except for modifications by representatives of the manufacturer or the manufacturer's distributors in the field, while the user-settable data can be programmed at the factory and then reprogrammed by end users in the field.

In particular, the present invention relates to a genset controller that is configurable for controlling a variety of types of gensets. The genset controller includes a memory for storing a plurality of software routines, a personality profile data set, and a user-settable data set, and further includes a processor coupled to the memory for executing the software routines and reading data from the personality profile data set and the user settable data set to control the genset. The genset controller additionally includes an input port coupled to the memory for enabling changes to the personality profile data set and the user-settable data set to be downloaded into the memory. The personality profile data set and the user-settable data set include data that configures the genset controller for operation with a particular genset.

The present invention further relates to a genset controller that is configurable for controlling a variety of types of gensets. The genset includes a memory means for storing a plurality of software routines, and a plurality of characteristic data, a processor means coupled to the memory means for executing the software routines in order to control a genset, and an input means coupled to the memory means for receiving the plurality of characteristic data. The characteristic data is stored separately from the software routines in the memory means so that the characteristic data can be downloaded without impacting the software routines.

The present invention additionally relates to a method of configuring a genset controller for controlling a genset. The method includes storing a plurality of software routines, a personality profile data set, and a user-settable data set, and operating the genset by executing the software routines which employ the personality profile data set and the user-settable data set. The method further includes downloading changes to the personality profile data set at a first time to alter the manner in which the genset is operated by execution of the software routines, and downloading changes to the user-settable data set at at least one of the first time and a second time subsequent to the first time to alter the manner in which the genset is operated by execution of the software routines.

BRIEF DESCRIPTION OF THE DRAWINGS

FIG. 3 is a detailed block diagram of synchronous software tasks that are performable by the genset controller of FIG. 1; and FIG. 4 is a detailed block diagram of asynchronous software tasks that are performable by the genset controller of FIG. 1.

DETAILED DESCRIPTION OF THE PREFERRED EMBODIMENT

Figure 1:
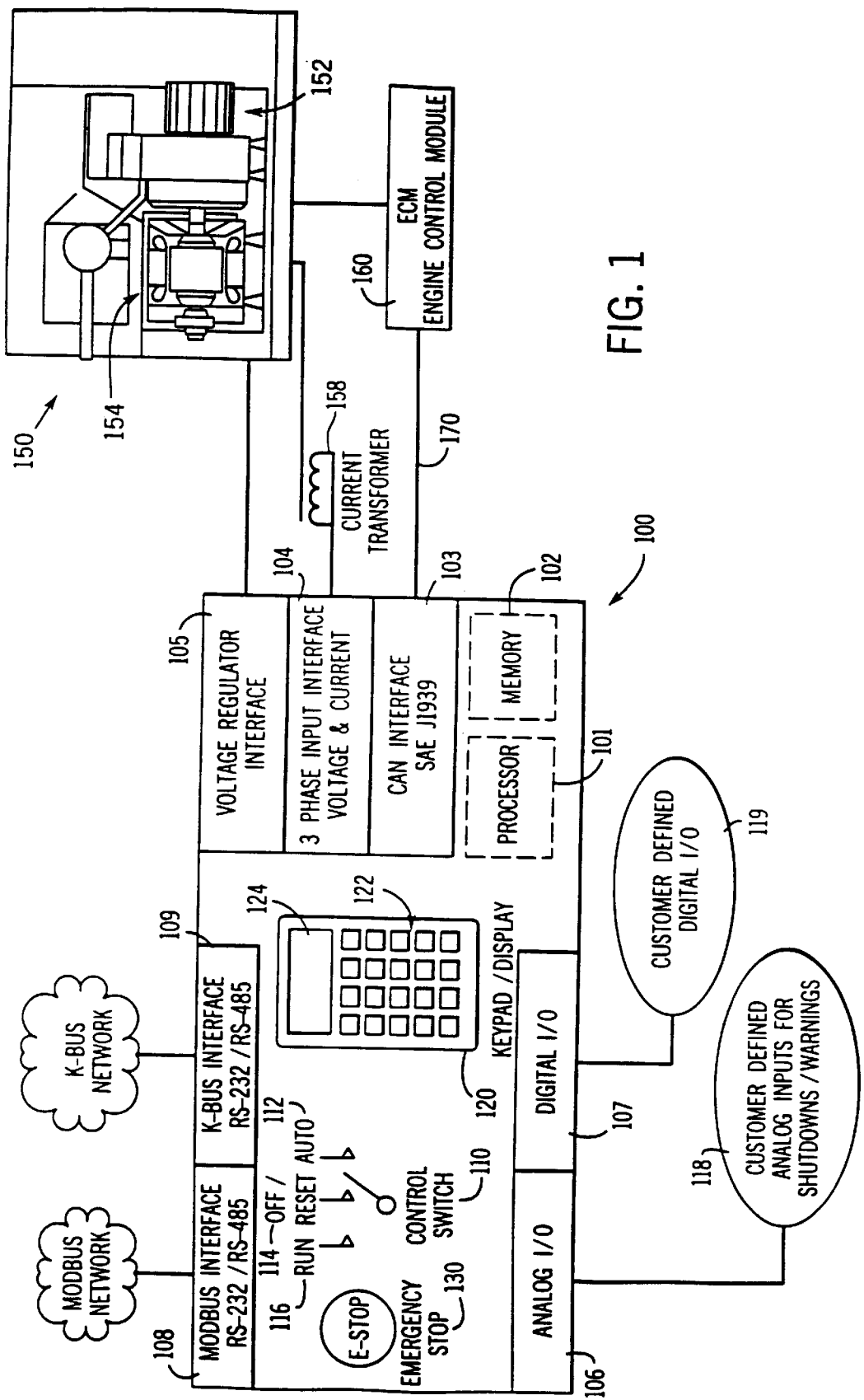
FIG. 1 is a block diagram showing a genset including an alternator, an engine control module, and a genset controller capable of being configured for operation with a variety of gensets in accordance with one embodiment of the present invention.

Referring to FIG. 1, a generator set controller (or genset controller) 100 is shown coupled to a generator set (genset) 150. Genset controller 100 can be located remotely from genset 150 (up to 40 feet) or attached to the genset directly by way of an engine harness. Genset 150 includes an engine 152 and an alternator (or synchronous generator) 154, and has a typical power rating of between 20 KW and 2000 KW or more. Engine 152 is typically an internal combustion engine that is powered by gasoline, diesel fuel, methane gas or other fuels, for example, the Series 60, Series 2000 or Series 4000 engines manufactured by Detroit Diesel Company of Detroit, Mich. Engine 152 rotates a rotor (not shown)of alternator 154, which outputs electrical power. Alternator 154 is typically a three-phase machine, such as the Model 5M4027 alternator manufactured by Marathon Electric Company.

Figure 2:
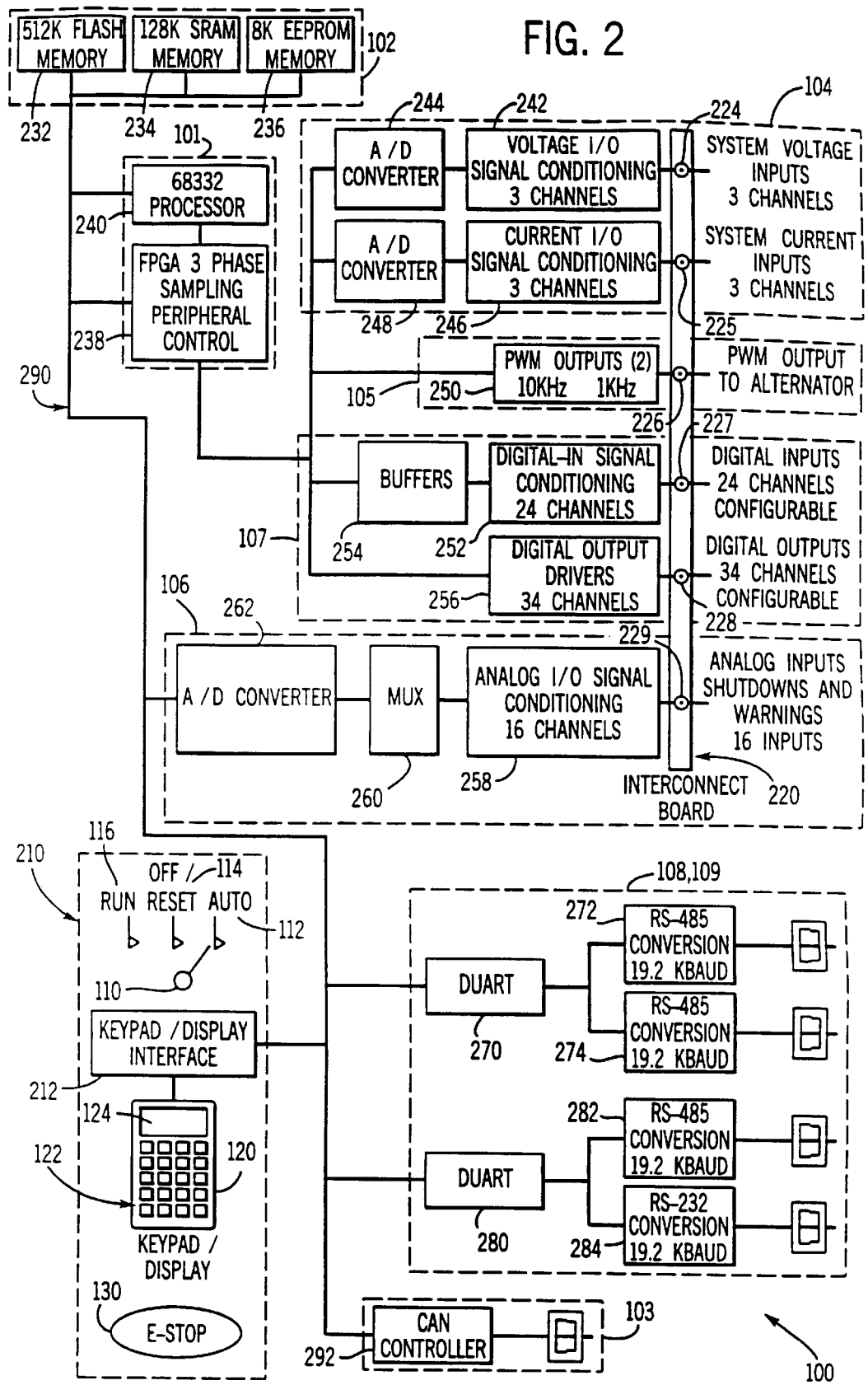
FIG. 2 is a detailed block diagram of the genset controller of FIG. 1.

Genset controller 100 operates to control and monitor the operation of genset 150. As shown in FIGS. 1 and 2, genset controller 100 is a microprocessor-based (or otherwise computer-driven) system having a processor 101 and a memory 102. Referring to FIG. 2, memory 102 includes a 512 K FLASH memory 232, a 128 K SRAM memory 234, and an 8 K EEPROM memory 236. Processor 101 includes a microcontroller or microprocessor 240 (e.g., a MC68332 processor manufactured by Motorola, Inc. of Schaumburg, Ill.), and also a field-programmable gate array (FPGA) 238. FPGA 238 allows for memory allocation among memories 232–236. Processor 101 and memory 102 are coupled to one another and other elements of the genset controller 100 by an internal bus structure 290.

Genset controller 100 employs several interfaces to provide control and monitoring of genset 150, including a CAN interface 103, a three-phase input interface 104, a voltage regulator interface 105, an analog input/output interface (analog I/O) 106 and a digital input/output interface (digital I/O) 107. Three-phase input interface 104, voltage regulator interface 105 and digital I/O 107 each are coupled directly to FPGA 238 of processor 101, which allows for signal sampling, signal multiplexing, and control of peripheral devices (such as operator interface devices, discussed below). CAN interface 103 and analog I/O 106 are coupled to processor 101 by way of internal bus 290. Input and output ports for each of interfaces 104–107 are provided on an interconnect board 220 of genset controller 100.

The processor 240 operates under the direction of stored program instructions to read in information through the three-phase input interface 104 regarding the operation of the alternator 154 in the genset 150. Referring to FIGS. 1 and 2, the three-phase alternator output voltages are applied to system voltage inputs 224, and the three-phase alternator output currents are coupled through a current transformer 158 to system current inputs 225. These six analog input signals are filtered by respective voltage and current conditioning circuits 242 and 246 and are digitized by respective voltage and current analog-to-digital converters 244 and 248. These digitized indications of alternator output voltages and currents are read by the processor 240 and used to monitor genset performance. This information may be displayed and it may be used to calculate other genset operating parameters, such as output power, reactive power, power factor and alternator duty level and frequency.

The digitized alternator output signals are also used as the basis for controlling the operation of the alternator 154. As will be described below, the processor 101 is programmed to provide command signals to the voltage regulator interface 105. These commands operate a pulse width modulation (PWM) unit 250 which outputs pulse-width modulated signals to PWM output 226 of interconnect board 220. These PWM signals are applied to alternator 154 to control the voltage, current, and power output levels of the alternator. In particular, voltage regulator interface 105 provides an approximately 10 KHz PWM signal to adjust the field current on alternator 154 to control the armature voltage and maintain the output voltage at a particular level. The voltage regulator interface 105 may also provide a 1 KHz PWM signal for governing engine speed 152, if an ECM is not employed.

In addition to providing control and monitoring of alternator 154, genset controller 100 also provides control and monitoring of engine 152. Although in certain embodiments genset controller 100 directly controls engine 152, in the preferred embodiment genset controller 100 does not directly control the engine. Rather, the operation of engine 152 is directly controlled by an engine control module (ECM) 160, which typically is physically attached to the engine. ECM 160 can control engine speed (and other engine operating parameters), and thereby control the output power of alternator 154. ECM 160 also monitors a variety of engine characteristics, for example, fuel consumption, oil pressure, emissions levels, coolant temperature, time delay engine cool down information, and time delay engine start information.

The genset controller 100 controls and monitors the ECM 160 through CAN interface 103 which connects to the CAN serial link 170. CAN serial link 170, employs the SAE J1939 protocol which is an industry standard protocol for serial communications. By way of CAN databus 170, genset controller 100 receives the information about the operation of engine 152 that has been collected by ECM 160, and provides commands to the ECM 160 to influence the operation of the engine. In particular, upon determining the occurrence of system faults, genset controller 100 provides commands to engine 152 via ECM 160 causing the engine to shutdown, by turning off both the ignition fuel control valve and the cranking of the engine.

The genset controller 100 includes analog I/O 106 and digital I/O 107 which enable it to communicate with a variety of devices. The analog I/O 106 receives up to sixteen separate analog input signals at inputs 229 on interconnect board 220. These analog signals are filtered by conditioning circuit 258, and applied to an A/D converter 262 through a multiplexer 260. The processor 101 can thus sequentially scan the analog inputs and read in digitized signals indicative of engine parameters such as engine temperature, gas emissions and engine battery charge.

The digital I/O 107 receives 24 single-bit TTL signals at digital inputs 227, and produces 34 single-bit TTL signals at digital outputs 228 on interconnect board 220. Digital inputs 227 are coupled to a digital input signal conditioning unit 252, which conditions the input signals and provides the signals to FPGA 238 via buffers 254. Three of the inputs 227 are dedicated to signals relating to emergency stopping, remote starting, and low coolant level of genset 150. The remaining inputs are definable inputs, which can be enabled or disabled, and are coupled to a variety of discrete sensors. The discrete sensors are capable of indicating various types of engine characteristics, warning conditions, and system faults relating to low fuel, or high oil temperature, as well as switchgear conditions concerning the synchronization of the power output of genset 150 with power lines to which the genset is being connected.

Genset controller 100 is capable of performing a variety of functions in response to the signals received at analog inputs 229 and digital inputs 227. In particular, genset controller 100 is capable of scaling the signals, monitoring genset parameters through the use of the signals, detecting system faults, and providing system warnings or system shutdowns in response to the signals. As will be discussed in more detail below, genset controller 100 is also capable of displaying (in real-time) information obtained from the signals, providing relay driver outputs (RDOs) in response to the signals, and relaying information in the signals to remote control and monitoring stations.

The 34 digital outputs 228 are driven by digital output drivers 256. The digital outputs 228 are controlled by the processor acting through FPGA 238. Three digital outputs are dedicated to a Controller Panel Lamp Relay, a Controller Engine Crank Relay, and a Controller Engine Fuel Relay. The remaining digital outputs are definable, and typically are RDOs that determine the on/off status of a variety of indication/warning lamps within a remote control station. The definitions of these digital outputs typically correspond to particular system warnings, shutdowns or other conditions. For example, the definable digital outputs can be RDOs corresponding to "NFPA-110" functions such as overspeed, overcranking, low oil pressure, or high coolant temperature of engine 152. The definable digital outputs can also be RDOs corresponding to loss of signal functions, including a loss of communications with ECM 160. Additionally, the definable digital outputs can be RDOs corresponding to one of many system fault conditions concerning the genset 150 or the genset controller 100 itself.

As shown in FIGS. 1 and 2, genset controller 100 also includes a number of operator interface devices, by which an operator can both provide commands to the genset controller and receive information from the genset controller. The operator interface devices are included on a front panel Man Machine Interface (MMI) 210, which is situated on a controller box. One of the operator interface devices is an emergency stop button 130. Emergency stop button 130 allows an operator to immediately stop the genset 150 by pressing a pushbutton.

A second operator interface device is a keypad/display 120, which includes 16 individual keypads 122 and a vacuum flourescent display (VFD) 124. Keypad/display 120 is coupled to a keypad/display interface 212 in front panel MMI 210, which in turn is coupled to internal databus 290. Keypads 122 allow an operator to enter a variety of information and commands to genset controller 100. VFD 124 is an alphanumeric display, and allows genset controller 100 to display various information concerning system operation and system faults to an operator. A VFD is employed because it provides good visibility over a large range of temperatures and from a wide range of viewing angles.

The operator interface devices further include a control switch 110, which can be rotatably set to one of three positions: an Automatic (Auto) position 112; an Off/Reset position 114; and a Run position 116. Setting the control switch to Run position 116 causes genset controller 100 to send a signal via ECM 160 to start and run the genset 150. Setting control switch 110 to Auto position 112 allows the genset 150 to be started and controlled from a remote location. This mode of operation also allows for time-delayed engine starting and cool-down. Setting control switch 110 to Off/Reset position 114 initiates the immediate shutdown of genset 150 and also results in a resetting of the software of genset controller 100. If a fault occurs that precipitates a system shutdown, an operator must move control switch 110 to Off/Reset position 114 to clear the fault before genset 150 can be started again.

Genset controller 100 also includes other devices which provide information to an operator, including several light-emitting diodes(LEDs) and an alarm horn (not shown). These devices are used to provide system status information to an operator, as well as to alert the operator to the existence of system faults. During the occurrence of some faults, a message concerning the fault or related warning/shutdown condition is displayed on VFD 124, an appropriate warning LED on front panel MMI 210 is turned on, the alarm horn is activated, and a corresponding RDO is produced at a digital output 228.

As shown in FIG. 1, genset controller 100 is capable of communication with other remote control and monitoring devices via both a K-BUS interface 109 and a second serial interface 108. K-BUS interface 109 provides serial communications using the proprietary K-BUS serial communications protocol. Second serial interface 108 provides serial communications using any of a variety of other "open" serial communications protocols, including the Modbus™ protocol. Each of K-BUS interface 109 and second serial interface 108 is configurable to use either the RS-232 or RS-485 standards.

In the preferred embodiment shown in FIG. 2, the structures associated with K-BUS interface 109 and second serial interface 108 include a first dual universal asynchronous receiver/transmitter (DUART) 270 that is coupled to two RS-485 conversion units 272 and 274, and a second DUART 280 that is coupled to an RS-485 conversion unit 282 and an RS-232 conversion unit 284. Each of DUARTs 270, 280 is coupled to internal databus 290 and is controlled in response to program instructions executed by microcomputer 240.

The microprocessor 240 operates the genset under the direction of programs illustrated in FIGS. 3 and 4. The programs include scheduled tasks which, as illustrated in FIG. 3, are performed one at a time under the direction of a task scheduler program 302. The programs also include asynchronous tasks as illustrated in FIG. 4. The asynchronous tasks are performed in response to interrupts that are managed by a real time, asynchronous program 402.

Referring to FIGS. 3 and 4, two block diagrams 300, 400 are provided showing software based subsystems (or tasks) that are performed by microprocessor 240 of genset controller 100. Through the operation of these subsystems, microprocessor 240 is capable of monitoring genset 150 (as well as capable of monitoring the operation of genset controller 100), receiving operator commands, detecting system faults, providing system warnings and shutdowns when necessary, displaying information at keypad/interface 120 (and at other operator interface devices), and conducting communications with genset 150, ECM 160 and other devices via K-BUS interface 108 and second serial interface 109. The subsystems of block diagrams 300, 400 are self-contained routines that control specific aspects of genset controller 100. Each subsystem is an independent, modular unit with well-defined input/output protocols to communicate with other subsystems.

Block diagram 300 shows scheduled subsystems, which are scheduled according to a task scheduler subsystem 302. The task scheduler subsystem is capable of invoking any subsystem at a rate of up to 100 times a second, and is able to handle transitions between subsystems and to monitor the execution times of subsystems to make sure that subsystems do not exceed their time allotments. As shown, other scheduled subsystems (which are scheduled by task scheduler subsystem 302) include a user interface subsystem 304, a state machine subsystem 306, a metering subsystem 308, a voltage regulator subsystem 310, a display subsystem 312, a digital inputs subsystem 314, and a fault detection/handling subsystem 316. Further, the scheduled subsystems include a load disturbance detection subsystem 318, a Modbus™ (or other serial communications) subsystem 320, a K-BUS subsystem 322, a thermal protection subsystem 324, an analog inputs subsystem 326, and an EEPROM data storage subsystem 328.

Block diagram 400 shows asynchronous subsystems. As shown in block 402, these subsystems operate in real time, asynchronously, with respect to the scheduled subsystems (i.e., operate in the "background" of the scheduled subsystems). The asynchronous subsystems also provide data when the scheduled subsystems require such data. The asynchronous subsystems are interrupt-driven modules and can take advantage of special features of microprocessor 240 (such as the embedded time processing unit within the microprocessor). The asynchronous subsystems include a serial communications subsystem 404, a timer subsystem 406, a real time math subsystem 408 (which employs a time processing unit of microprocessor 240), and a SAE J1939 interface subsystem 409.

The scheduled and unscheduled tasks of FIGS. 3 and 4 which govern the operation of the genset controller 100 constitute application software that is stored within the memory 102 of the genset controller and is not modifiable by the user. Additionally stored within the genset controller 100, however, is a first set of data called a personality profile and a second set of data that is user-settable. The personality profile and user-settable data concerns the genset 150 or its contents (e.g., the engine/alternator combination within the genset), and is stored within the 512 K FLASH memory 232. Both types of data can be repeatedly modified.

Both the personality profile data and the user-settable data can be loaded onto the genset controller 100 by way of one of the ports of the serial interface 108, particularly the RS-232 port 284. Additionally, the user-settable data can be loaded onto the genset controller 100 by way of the keypad/display 120, from a Modbus™ communication link, or from a remote location using a Windows Monitor II program by Kohler Company. By storing the personality profile and user-settable data separately from the application software, it is possible to quickly and easily restore information concerning the control of a particular genset, by downloading it from a central database, without having to download, modify, or otherwise interact with the application software.

The personality profile data includes data that varies depending upon the genset 150 that is coupled to the genset controller 100, i.e., the "personality" of the genset. In particular, such data includes data regarding the alternator 154 of the genset 150 such as a transient open circuit time constant of the alternator, the number of alternator poles, a fixed voltage flag if the genset operates at one fixed voltage only, and a maximum power rating for a fixed voltage alternator. Where the alternator can have variable outputs, e.g., depending upon the frequency of operation and other variables, multiple maximum power ratings are included within the personality profile data. Additionally, alternator current limits can be specified for various voltage settings.

In addition to data regarding the alternator 154, the personality profile data also includes voltage regulator gain constants, a speed sensor constant that can be used to determine engine RPM, and data regarding the engine 152 such as a default gain for the regulator of the engine and multiple engine speed warning and shutdown settings. The engine speed warning and shutdown settings can be used for operation of the genset at several speed settings such as idle and rated speed. Additionally, certain identification information is stored as part of the personality profile data, including a genset serial number, an alternator model number, and an engine model number. Depending upon the embodiment, the personality profile data can include a variety of other types of information as well, such as the engine shutdown oil pressure. In the present embodiment, the personality profile data is specifically stored within a data structure for genset-embedded constants, within the 512 K FLASH memory 232.

The personality profile data is data specifying significant features of the genset 150 to which it is necessary for the genset controller 100 to be tailored in its operation. Consequently, the personality profile data is loadable only at the factory by the manufacturer or by representatives of the manufacturer's distributors in the field, by way of the serial interface 108 or in alternate embodiments by way of the K-BUS interface 109, to assure that the personality profile data is properly installed. The genset controller 100 is configured to be able to receive new personality profile data in the field in case there is a problem in the field that necessitates reloading of the personality profile data.

The personality profile data allows for more precise control of a given genset 150 by the genset controller 100 than would otherwise be the case. For example, the maximum power ratings are specific to the given genset 150 under various operational circumstances such as various frequencies of operation, and allow for proper voltage regulation of the genset. Also in certain embodiments, through the use of the serial number information or other information, the genset controller 100 can determine whether the genset 150 is to be controlled by an ECM 160, and whether the ECM is to be coupled in between the genset controller and the genset. By obtaining this information, the genset controller 100 can provide more accurate control and more complete monitoring of the genset 150 by taking advantage of any additional control and monitoring capabilities that are available due to the existence of the ECM 160.

Additionally, based upon the serial number information as well as the type of maximum power rating information that is provided in the personality profile data, the genset controller 100 can determine whether the alternator 154 within the genset 150 to be controlled includes any circuit breakers for preventing excessive currents and heat generation. Thus, the genset controller 100 can determine whether it should employ, in the absence of such circuit breakers, a thermal protection subroutine such as that discussed in the patent application entitled "METHOD AND APPARATUS FOR PREVENTING EXCESSIVE HEAT GENERATION IN AN ALTERNATOR OF A GENERATOR SET" referred to above. Thus, the personality profile data assures proper control of the excitation level of the alternator 154 so that excessive currents and heat exposure do not occur within the alternator.

Further, the personality profile data provides the genset controller 100 with various failsafes to preclude improper operation of the genset 150. To begin, the genset controller 100 is able to compare the serial numbers of the personality profile data with serial numbers that are entered as part of the user-settable data, as discussed below. If two serial numbers do not match upon powerup of the genset 150, a serial number mismatch warning is issued to the fault detection/handling subsystem 316. Additionally, if personality profile data is entirely absent from the memory 102 of the genset controller 100 upon powerup of the genset 150, a warning is issued to the fault detection/handling subsystem 316 that prevents the starting of the engine 152.

Turning to the user-settable data, this data is loadable at the factory and in the field, and is loadable both by representatives of the manufacturer/distributors and by users themselves. As discussed, the user-settable data can be loaded by way of the keypad/display 120, by way of the Modbus™ communication link, and from a remote location using the Windows Monitor II program by Kohler Company, in addition to loading by way of the serial interface 108. Thus, in the present embodiment, the genset controller 100 is designed to facilitate the ability of users to update or modify their genset controller 100 for controlling an updated or new genset 150. The amount of data that is user-settable depends upon the embodiment of the invention, although in the present embodiment, the user-settable information includes approximately 3000 bytes of information.

In the present embodiment, the user-settable data includes data concerning the output voltage and frequency of operation of the genset 150. This data signifies to the genset controller 100 the expected levels of operation of the genset 150 in terms of voltage and frequency, which information is utilized by the genset controller 100 in controlling the genset 150. Additionally, the user-settable data includes information specifying the identities of several of the analog inputs 229 and digital inputs 227. This information allows the genset controller 100 to obtain additional information regarding the operation of the genset 150 for monitoring and control purposes. The user-settable data also includes certain identification information which is compared to the identification information of the personality profile data, as discussed above.

Aside from the identification information, in general the user-settable information is less critical to proper operation of the genset 150 than is the personality profile data. Whereas, generally speaking, improper personality profile data would render the genset controller 100 incapable of operating a given genset 150, improper user-settable data will merely reduce the accuracy and performance of the genset controller 100 in its control and monitoring of the genset 150. Consequently, the entry of the user-settable data is made more flexible to users by allowing input of the data by way of keyboard/display 120.

While the foregoing specification illustrates and describes the preferred embodiments of this invention, it is to be understood that the invention is not limited to the precise construction herein disclosed. The invention can be embodied in other specific forms without departing from the spirit or essential attributes of the invention. Accordingly, reference should be made to the following claims, rather than to the foregoing specification, as indicating the scope of the invention.

What is claimed is:

1. A genset controller that is configurable for controlling a variety of types of gensets, the genset controller comprising:
a memory for storing a plurality of software routines, a personality profile data set, and a user-settable data set;
a processor coupled to the memory for executing the software routines and reading data from the personality profile data set and the user settable data set to control the genset; and
an input port coupled to the memory for enabling changes to the personality profile data set and the user-settable data set to be downloaded into the memory; and wherein the personality profile data set and the user-settable data set include data that configures the genset controller for operation with at least one of a particular genset and an engine/alternator combination within a particular genset, wherein the personality profile data set includes at least one of a transient open circuit time constant of the alternator, a number of alternator poles, a fixed voltage flag, a single maximum power rating for a fixed voltage alternator, a plurality of maximum power ratings, a plurality of alternator current limits corresponding to respective alternator voltage settings, a plurality of voltage regulator gain constants, a default gain for a regulator of an engine of the genset, a speed sensor constant to determine engine RPM, a plurality of engine speed warning and shutdown settings, a genset serial number, an alternator model number, an engine model number, and an engine shutdown oil pressure.

2. The genset controller of claim 1, further comprising a keypad interface by which the user-settable data set is downloaded into the memory.

3. The genset controller of claim 1, wherein the user-settable data set includes at least one of a present output voltage of the genset, a present operational frequency of the genset, an identity of an analog input, an identity of a digital input, a genset serial number, an alternator model number, and an engine model number.

4. The genset controller of claim 1, wherein the genset controller is capable of determining whether an engine control module (ECM) is being employed to control the genset based upon at least one of the personality profile data set and the user-settable data set.

5. The genset controller of claim 1, wherein the genset controller is capable of determining whether the genset includes a circuit breaker for preventing excessive current and heat generation within an alternator of the genset.

6. The genset controller of claim 5, wherein the genset controller is configured to execute a thermal protection subroutine when it determines that the genset does not include the circuit breaker.

7. The genset controller of claim 6, wherein the memory comprises a 512K FLASH memory in which the personality profile data set and the user-settable data set are stored, and further comprises an additional memory element in which the software routines are stored.

8. The genset controller of claim 1, wherein the input port is an RS-232 serial input port by which the user-settable data set is input and downloaded into memory.

9. The genset controller of claim 1, wherein operation of the genset will be disabled by the genset controller if a personality profile data set has not been downloaded into memory.

10. The genset controller of claim 1, wherein a fault will occur if at least one of a genset serial number, an alternator model number, and an engine model number within the personality profile data set does not match a respective one of a genset serial number, an alternator model number, and an engine model number within the user-settable data set.

11. The genset controller of claim 1, wherein the personality profile data set is capable of being downloaded at one of a facility at which the genset controller is manufactured, a facility at which the genset controller and the genset are assembled together, and a field location at which a representative of a distributor is effecting a modification to the genset controller; and wherein the user-settable data is capable of being downloaded at any one of the places at which the personality profile data set is capable of being downloaded, and additionally is capable of being at least one of downloaded from a serial communication link, downloaded remotely using a program, and downloaded by the action of a user who intends to operate the genset.

12. The genset controller of claim 1, wherein the personality profile data set and the user-settable data set are stored separately from the software routines in the memory so that the personality profile data set and the user-settable data set are downloaded without impacting the software routines.

13. A genset controller that is configurable for controlling a variety of types of gensets, the genset controller comprising:

a memory for storing a plurality of software routines, a personality profile data set, and a user-settable data set;

a processor coupled to the memory for executing the software routines and reading data from the personality profile data set and the user settable data set to control the genset; and an input port coupled to the memory for enabling changes to the personality profile data set and the user-settable data set to be downloaded into the memory; and wherein the personality profile data set and the user-settable data set include data that configures the genset controller for operation with at least one of a particular genset and an engine/alternator combination within a particular genset, wherein the input port is an RS-232 serial input port by which the user-settable data set is capable of being inputed and downloaded into memory, wherein the personality profile data set is capable of being downloaded at one of a facility at which the genset controller is manufactured, a facility at which the genset controller and the genset are assembled together, and a field location at which a representative of a distributor is effecting a modification to the genset controller; and wherein the user-settable data set is capable of being downloaded at any one of the places at which the personality profile data set is capable of being downloaded, and additionally is capable of being at least one of downloaded from a serial communication link, downloaded remotely using a program, and downloaded by the action of a user who intends to operate the genset.

14. A method of configuring a genset controller for controlling a genset, the method comprising:

storing a plurality of software routines, a personality profile data set, and a user-settable data set;

operating the genset by executing the software routines which employ the personality profile data set and the user-settable data set;

downloading changes to the personality profile data set at a first time to alter the manner in which the genset is operated by execution of the software routines; and downloading changes to the user-settable data set at at least one of the first time and a second time subsequent to the first time to alter the manner in which the genset is operated by execution of the software routines.

15. The method of claim 14, further comprising:

comparing a first segment of identification information within the personality profile data set with a second segment of identification information within the user-settable data set; and providing a fault signal if the two segments of identification information do not match one another.

16. The method of claim 14, further comprising:

preventing operation of the genset by way of the genset controller if the personality profile data set is improper in that it contains no information.

17. The method of claim 14, wherein the personality profile data set includes at least one of a transient open circuit time constant of the alternator, a number of alternator poles, a fixed voltage flag, a single maximum power rating for a fixed voltage alternator, a plurality of maximum power ratings, a plurality of alternator current limits corresponding to respective alternator voltage settings, a plurality of voltage regulator gain constants, a default gain for a regulator of an engine of the genset, a speed sensor constant to determine engine RPM, a plurality of engine speed warning and shutdown settings, a genset serial number, an alternator model number, an engine model number, and an engine shutdown oil pressure.

18. The method of claim 14, wherein the user-settable data set includes at least one of a present output voltage of the genset, a present operational frequency of the genset, an identity of an analog input, an identity of a digital input, a genset serial number, an alternator model number, and an engine model number.

19. The method of claim 14, wherein the genset controller is capable of determining whether an engine control module (ECM) is being employed to control the genset based upon at least one of the personality profile data set and the user-settable data set.

20. The method of claim 14, wherein the genset controller is capable of determining whether the genset includes a circuit breaker for preventing excessive current and heat generation within an alternator of the genset.

* * * * *